United States Patent [19]
Jerkel

[11] Patent Number: 6,161,956
[45] Date of Patent: Dec. 19, 2000

[54] PROCESS AND DEVICE FOR THE SYNCHRONOUS CONVEYING OF FLOWABLE MATERIALS IN A MIXING DEVICE

[75] Inventor: Rudolf Jerkel, Krefeld, Germany

[73] Assignee: WiWa Wilhelm Wagner GmbH & Co. KG, Lahnau, Germany

[21] Appl. No.: 09/155,017
[22] PCT Filed: Mar. 8, 1997
[86] PCT No.: PCT/EP97/01181
  § 371 Date: Sep. 16, 1998
  § 102(e) Date: Sep. 16, 1998
[87] PCT Pub. No.: WO97/35659
  PCT Pub. Date: Oct. 2, 1997

[30] Foreign Application Priority Data

Mar. 22, 1996 [DE] Germany .......................... 196 11 339

[51] Int. Cl.[7] .................................................. B01F 15/04
[52] U.S. Cl. .................................. 366/160.4; 366/162.3; 222/134
[58] Field of Search .................................. 366/132, 142, 366/152.1, 152.2, 160.1, 160.2, 160.3, 160.4, 160.5, 162.1, 162.3, 177.1, 182.1, 182.2; 222/134, 135, 137, 145.1, 145.5, 145.6

[56] References Cited

U.S. PATENT DOCUMENTS

| | | | |
|---|---|---|---|
| 3,908,862 | 9/1975 | Chandra et al. | 222/135 |
| 4,079,861 | 3/1978 | Brown | 222/135 |
| 4,312,463 | 1/1982 | Daby | 222/134 |
| 4,832,499 | 5/1989 | Fiorentini | 366/160.1 |
| 4,881,820 | 11/1989 | Luckhoff | 366/142 |
| 5,556,007 | 9/1996 | Breitsprecher | 222/145.5 |

FOREIGN PATENT DOCUMENTS

| | | |
|---|---|---|
| 116879 | 8/1984 | European Pat. Off. . |
| 644025 | 3/1995 | European Pat. Off. . |
| 2541656 | 4/1976 | Germany . |
| 2736193 | 2/1979 | Germany . |

*Primary Examiner*—Charles E. Cooley
*Attorney, Agent, or Firm*—Flynn, Thiel, Boutell & Tanis, P.C.

[57] ABSTRACT

Instead of a discontinuous mixing process for mixing two or more flowable materials for a paint-spraying plant, a continuous mixing and conveying process is provided. Use is made of individual conveyor pumps driven individually by hydraulic adjusting units in the form of double-acting hydraulic cylinders. Control is exerted by an electronic control device controlling a proportional governor at hydraulic connecting lines between the adjusting units to adjust the stroke of pistons of the adjusting units and thus the ratio of the flowable material conveyed.

12 Claims, 1 Drawing Sheet

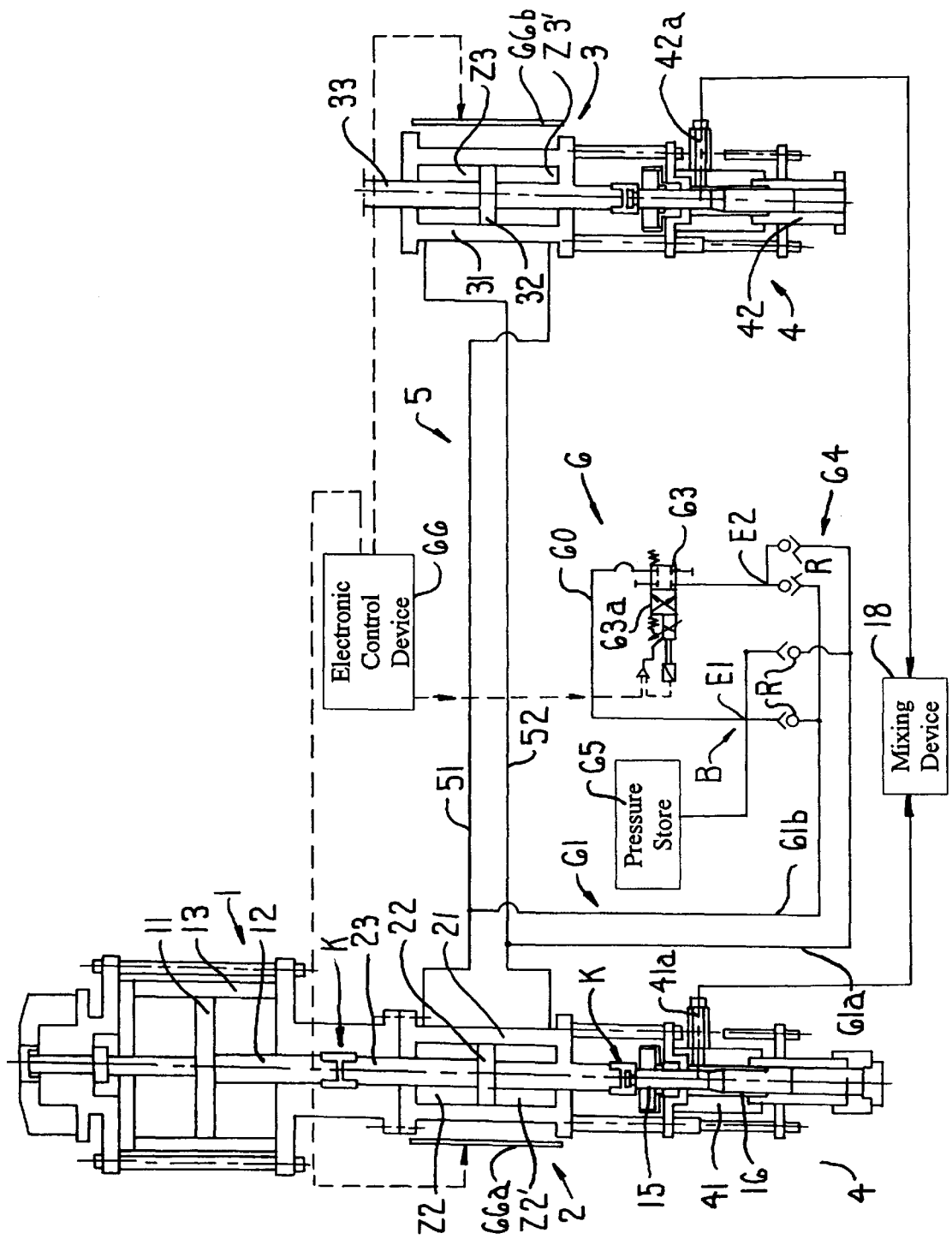

PROCESS AND DEVICE FOR THE SYNCHRONOUS CONVEYING OF FLOWABLE MATERIALS IN A MIXING DEVICE

FIELD OF THE INVENTION

The invention relates to a process for the synchronous conveying of flowable materials. The invention relates furthermore to a device for implementing such a process. More specifically, the invention relates to a process for the synchronous conveying of flowable materials with conveyor pumps in a mixing device, from which the mixture of these materials can be fed to a consumer, for example a spray-paint pistol, whereby the conveyor pumps are each operated by means of a hydraulic adjusting unit, in which one operating piston is guided in an operating cylinder, and whereby the adjusting units lie in a hydraulic circuit of a drive fluid loading the operating pistons. The invention relates furthermore to a device for implementing such a process.

BACKGROUND OF THE INVENTION

A process of this type and an associated device are already known from the Patent Application EP 0 644 025 A1, in which two dosing conveyor pumps convey the individual materials into one single mixing device in such a manner that a drive member of a first conveyor pump is loaded with a constant flow pressure and the flow pressure of the drive fluid loading a second drive member are each controlled by adjusting commands of a control device such that the through-flow measured values of the conveyor streams fed by the conveyor pumps have a predetermined relationship, which can be superimposed onto the control device as a desired value.

During a relatively slow conveying of the materials such a control indeed assures their homogeneous mixing. It is possible, at relatively high conveying speeds, for inhomogeneities to occur in the conveyed mixed goods, which can cause difficulties during technical use.

Moreover, the operating efficiency of the control depends essentially on the pressure measurements and controls in the circuit of the drive fluid, which demand measuring devices for the occurring pressures. The demand measuring devices can be calibrated and operate reliably over long periods of time. The measured values from these pressure measurements must thereby be connected with measured values for the travel paths covered by the operating pistons, for the determination of which distance sensors are mounted on the operating cylinders, which are controlled by the operating pistons themselves or by back and forth moving structural parts connected to these. The measured values of pressure and travel distance must then in addition be mathematically connected in order to obtain therefrom the actual values for the conveyor streams out of the conveyor pumps and, therefrom the actual mixture ratio of the materials fed to the mixer. Time delays must be expected in particular for mechanical measurement of the pressures. It is therefore not certain that the materials are continuously processed into a homogeneous mixture, which at all times has the desired mixture ratio. Rather local heterogeneities and deviations from the mixture ratio can, at times, not be avoided in the finished mixture.

It is also already known to carry out the conveying of the materials by means of conveyor pumps, each single one of which is driven by a hydraulic adjusting unit, and in which the flow of the drive fluid active in the adjusting unit can each be adapted by a control valve, which is controlled by a proportional governor. Even though high conveying pressures and performances can be easily handled here, the arrangement often cannot accomplish a mixing of homogeneous goods, which mixing is constant in a wide conveying range, because the adjusting units cannot be synchronized with one another in such a manner that the conveying directions correspond always in various adjusting units, especially when a reversal in direction of the operating piston movement takes place at the same time.

Therefore one obvious solution already used is to enable the drive of several adjusting units to be carried out only by one single drive unit so that the conveyor pumps are now operated simultaneously and one indeed achieves a homogeneous distribution of the conveyed materials in the mixed goods. The condition for a satisfactory operation is hereby a fixed and unchangeable mixture ratio. However, if one wants to change the mixture ratio, the conveyor pumps must be changed. In addition, adjustable gearing does not help when the technical parameters are supposed to be maintained very precisely without earlier additional expensive tests being carried out on the system.

Such a gearing is also called a swivel arm, with which at times a kinematic connection between the operating pistons is created, and which can be adjusted in such a manner that the ratio of the operating strokes carried out with the operating pistons can be changed. The maximum operating stroke of one of the adjusting units is mostly left constant and the operating stroke of the second adjusting unit is changed. The system must also be newly adjusted after each change. More difficult yet is that only limited drive and conveying performances can be realized with such lever gearings. The adjustment is connected with a considerable time input.

EP Patent 0 116 879 B1 discloses a process including an associated device, in which, in place of the pressure measured values, the through-flow measured values of the conveyor streams are measured and are superimposed as counting impulses onto a control device, and the conveyor volume of the participating materials are thereby determined in such a manner that in a first mixer, the mixing block, a desired mixture ratio is approached. The finished mixture is partially transported into a second mixer, the mixing pipe, from which it then can be continuously removed by a consumer. Thus at least two mixers are needed in order to create a continuously conveyed mixture.

The basic purpose of the invention is therefore to design a process and an associated device of the type identified in detail in the beginning in such a manner that a continuous mixing of the materials in one single mixing chamber and in one specified mixture ratio to one another occurs, the size of which moves in an interval, which meets all demands. Homogeneous throughout mixed goods are thereby obtained. A simple, robust and inexpensive device is able to be operated with an inexpensive control.

The purpose is attained, according to the invention, by a process wherein the control of the mixture ratios is very much simplified because now merely the operating strokes must be measured in the adjusting units. The ratio is characterized by a constant operating stroke of a first adjusting unit and an operating stroke of the second and each further adjusting unit, which operating stroke can be changed and defines the mixture ratio. Since the movements of the operating pistons occur simultaneously, and merely the flow of the operating fluid is controlled by the second and each further adjusting unit, the speed of the operating pistons change in the following adjusting units. Successful distance sensors are available for length measurement of the operating strokes, which sensors are already being used in such processes.

To carry out the process of the invention, a device can be used having at least two adjusting units which are designed as double-acting hydraulic cylinders and are hydraulically connected with one another in such a manner that the drive fluid conveyed under the influence of the drive motor out of the first adjusting unit drives the second adjusting unit in the same direction. Thus, the first adjusting unit functions hereby as the drive of both a first conveyor pump for a first material and also as the drive of a second adjusting unit and thus of a second conveyor pump associated with same for a further material without the adjusting units having been mechanically connected with one another. The above-described disadvantages of such a connection are avoided here. Also a separate drive for each of the conveyor pumps is not needed in the case of the device of the invention. Its adjusting units are separately hydraulically coupled with one another, and care must merely be taken at the second and eventually each further adjusting unit for a simultaneous course of travel for the other piston strokes with the piston on the first adjusting unit. The state of the art has many possibilities. As long as the drive fluid is not changed, adjustment occurs only once and must be corrected only when through leakages, volume differences occur in the drive fluid.

A hydraulic connection can be created in a simple manner in the adjusting units, which are inventively designed as double-acting hydraulic cylinders, such that the cylinder chambers of the operating cylinders on both sides of the respective operating piston are alternately connected with one another by hydraulic connecting lines, which are best designed as essentially nonblockable. The operating pistons are in this manner at all times loaded synchronously and in the same direction.

The volume of the operating fluid conveyed through the second adjusting unit is influenced such that the connecting lines are connected with one another through a hydraulic control line, and that a controllable blocking device is provided in the control line, whereby the branches of the control line are connected with one another preferably in a hydraulic bridge circuit like a Wheatstone bridge, and the blocking device is arranged in the bridge branch of the bridge circuit. The blocking device can advantageously be controlled by a proportional governor in dependency of the operating signal from the control device. Leakages are compensated for and a buffer is created for differences in amounts during the control when a preferably nonblockable pressure store for excessive drive fluid is provided in the control line.

The return points or reversing points of the back and forth moving operating pistons can be moved into corresponding concruency when the position of the operating piston having an accumulated drive fluid is changed on at least one adjusting unit.

The drive motor is, with respect to its design, basically not dependent on the device of the invention. However, it has been found to be particularly advantageous to operate it by means of compressed air. Thus it is possible that it can be switched in dependency of the pressure difference existing between the connecting lines, for example, by a travel distance valve placed into the pneumatic fluid lines for the drive motor, which in turn can be switched by the pressure difference. The drive motor can, in this manner, only be activated when the hydraulic system is in operation. The direction reversal can be controlled at its return points by contact switches or the like. The use of compressed air as driving energy is particularly advantageous by providing explosion protection when the process of the invention is used for spray painting.

It is advantageous when a drive piston of the drive motor, the operating piston of the first adjusting unit, and a dosing piston of the conveyor pump belonging to the same are rigidly connected with one another, preferably through tight couplings between the respective piston rods.

The control of the drive fluid can occur with a control block of four check valves installed in the control line, which valves are switched such that the drive fluid out of one connecting line is fed at excess pressure against the respective other connecting line through the blocking device into the pressure store or into the respective other connecting line, whereas at underpressure against the respective other connecting line out of the pressure store or out of the output of the blocking device. The control line can for this purpose consist in particular of each branch of the connecting lines, and each one check valve for both flow directions can be provided in each branch, whereby a common supply or discharge line for the blocking valve is connected to the check valves with the same flow direction. The pressure store or reservoir can be connected to the common discharge line by a branch.

Such a simple arrangement assures the control of the second operating drive with very simple means. The control members are successful, reliable structural parts of a simple design with a long life, which furthermore in case of a defect can quickly be exchanged.

It is easily possible that the adjusting unit is flanged to the drive motor in a conventional manner by means of several spacer bolts so that a moved machine part remains visible between the pistons of the drive motor and the adjusting unit. This machine part can be equipped with a motion pickup, which is stationary thereon, and which releases measuring signals to a distance position sensor fixed on the drive motor and/or the adjusting unit. Such an arrangement can also be provided between the adjusting unit and the flanged-on conveyor pump. It is very advantageous when an incrementally operating longitudinal scale rod is thereby used as the distance position sensor. Such primary elements consisting of a motion pickup and a distance position sensor are commercially available in many dimensions and with adjustable measurement lengths.

As a whole it has become possible through the invention that the mixture removed by the consumer at the mixer is not only essentially homogeneous but is also delivered in a constant ratio of the material parts. At the same time, expensive special constructions for the structural and operating elements, which are being used, are thereby avoided and instead structural parts available commercially for a long time are utilized.

BRIEF DESCRIPTION OF THE DRAWINGS

The invention will be discussed in greater detail hereinafter in connection with one exemplary embodiment and the drawing. The single FIGURE shows thereby a device of the invention in a rather schematic illustration, with which the process of the invention can be advantageously carried out.

DETAILED DESCRIPTION OF THE INVENTION

A device according to the invention includes a pneumatic drive motor 1, a first hydraulic adjusting unit 2 flanged to the drive motor 1, a second hydraulic adjusting unit 3, which is driven from the first adjusting unit 2, and the associated lines and control devices.

The adjusting units 2, 3 have the purpose of driving two conveyor pumps 4 for the dosing conveying of one flowable material each into a mixing device 18, in particular into a static or dynamic mixer of common design, which is schematically shown connected to the conveyor pumps 4 from their outputs 41a, 42a through hoses or pipelines.

The adjusting units 2, 3 each are essentially composed of one operating cylinder 21, 31 and one operating piston 22, 32, whereby piston rods 23, 33 are provided for the operating pistons 22, 32, which piston rods have the purpose of guiding the operating pistons 22, 32 in the operating cylinders 21, 31. Furthermore, the drive of the operating piston 22 is accomplished with the piston rod 23. It is for this purpose connected with the help of a tight coupling K to a piston rod 12, which belongs to a drive piston 11. Another coupling K couples piston rod 12 to a piston rod 15 for a dosing piston 16. The drive piston 11 is part of the pneumatic drive motor 1, which is designed as a double-acting piston engine. The corresponding compressed-air lines, which end in its piston cylinder 13, however, are not shown in the drawing. They are not directly part of the invention and are common state of the art in this field. A pneumatic distributing valve can be arranged in one of these lines, which valve enables switching of the drive motor 1 only in dependency of an orderly switching of the hydraulic area.

The adjusting units 2, 3 are designed as double-acting just like the drive motor 1. Their respective cylinder chambers Z2, Z3 or Z2', Z3' in the operating cylinders 21, 31 in front of and back of the operating pistons 22, 32 are hydraulically connected with one another through connecting lines 5. A first connecting line 51 connects thereby one cylinder chamber Z2 of the adjusting unit 2 to a cylinder chamber Z3' of the adjusting unit 3 and a second connecting line 52 connects the two remaining cylinder chambers Z2', Z3 with one another. The stamping pressure exerted by the operating piston 11 exists thereby in the cylinder chambers Z2, Z3' when the drive piston 11 is driven in conveying direction, whereas the other cylinder chambers Z2', Z3 have a significantly lower hydraulic pressure, because the operating pistons 22, 23 carry out merely the pure operation of movement via the drive fluid. The pressure relationships are correspondingly reversed during a counter-stroke of the operating piston ii.

Branches 61a, 61b of a control line 61 are branched off to a control device 6 from the connecting lines 5. The control device 6 further includes a blocking device 63, a control block 64 and a pressure store or reservoir 65. An electronic control device 66 controls the blocking device 63. The blocking device 63 is moved by a proportional 35 governor 63a in such a manner that a second conveyor pump 42, which is flanged to the adjusting unit 3 and is driven by same, feeds a conveyor volume changeable with respect to a first conveyor pump 41 into the mixer. The volume stream, which is moved through the respective connecting lines 5 by the operating piston 22, is for this purpose divided by the blocking device 63 into a part, which is fed into one of cylinder chambers Z3, Z3' of the second adjusting unit 3, and does not at all pass the blocking device 63, and into a part, which is returned through the other connecting line 5 into the adjusting unit 2 and also into one of its cylinder chambers Z2, Z2'.

One can in this manner use the first adjusting unit 2 as a guiding device with a constant operating stroke and constant conveyor stream from the flanged-on conveyor pump 41. The second adjusting unit 3, as a follow-up device, carries out a variable operating stroke, which determines the conveyor stream from the second conveyor pump 42 and the respective mixing ratio of the materials fed to the mixer.

The branches 61a, 61b of the control line 61 form a hydraulic bridge circuit B like a Wheatstone bridge, into the bridge branch 60 of which is placed the blocking device 63. The control stream flowing through the bridge branch 60 directs its flow direction in accordance with the conveying direction of the operating piston 11, whereby in each case the opposite direction is blocked by check valves R. The blocking direction of each of two strands of the control line 61, which converge at common ends E1, E2 of the bridge branch 60, is the same.

The pressure store 65 is also connected to the bridge branch 60, into which store excessive operating fluid is fed, if necessary, which when needed again is discharged from the pressure store 65.

The regulating distances of the operating pistons 22, 32 in the adjusting units 2, 3 are detected by distance position sensors 66a, 66b, which are a part of the control device 66 and the measuring signals of which stand ready as actual values in the control device 66. Each operating piston 22, 32 itself can serve as the motion pickup. However, it is also possible to use a separate motion pickup fastened to the piston rods 23, 33.

The operating signal, which is obtained through a comparison of the measuring signals delivered from the position sensors 66a, 66b with a variable desired value adjusted at the control device 66, is superimposed from the control directly onto the proportional governor 63a.

What is claimed is:

1. A process for continuous, synchronous conveying of flowable materials by first and second conveyor pumps into a mixing device, from which the mixture of these materials feeds to an application device, whereby the first and second conveyor pumps are operated by respective first and second hydraulic adjusting units, in which first and second operating pistons are guided in respective first and second operating cylinders, and whereby the adjusting units lie in a hydraulic circuit of a drive fluid loading the operating pistons, whereby the first operating piston is driven to move back and forth in the first adjusting unit by a drive motor, and an essentially constant operating volume of the drive fluid is provided in the hydraulic circuit, wherein strokes of the first and second operating pistons are each measured by first and second position sensors arranged on the first and second operating cylinders, and measuring signals obtained by the position sensors are fed into a control device for controlling a constant mixture ratio of the flowable materials, a difference of the respective measuring signals from the first and second adjusting units being compared in the control device as an instantaneous actual value with an associated desired value, and from the difference of the actual and desired values an operating signal for the mass flow of the drive fluid is formed, and return points for back and forth movement of the operating pistons are selected approximately simultaneously with a drive motor return point of the movement in the drive motor.

2. A device for carrying out a process according to claim 1, wherein the first and second adjusting units comprise double-acting hydraulic cylinders hydraulically connected with one another in such a manner that the drive fluid conveyed under the influence of the drive motor out of the first adjusting unit drives the second operating piston in the second adjusting unit in the same direction as the first operating piston, first and second respective cylinder chambers of the first and second operating cylinders on both sides of the respective operating pistons being alternately connected with one another by hydraulic connecting lines, wherein the connecting lines are connected with one another through a hydraulic control line, and a controllable blocking device is provided in the control line, the blocking device being controlled by a proportional governor in response to the operating signal from the control device.

3. The device according to claim 2, wherein branches of the control line are connected with one another in a hydraulic bridge circuit and the blocking device is arranged in a bridge branch of the bridge circuit.

4. The device according to claim 2, wherein a nonblockable pressure store for excess drive fluid is provided in the control line.

5. The device according to claim 4, wherein a control block of four check valves is installed in the control line, which are switched such that the drive fluid out of one of the connecting lines is fed at excess pressure against the respective other connecting line through the blocking device into the pressure store or into the respective other connecting line, whereas at underpressure against the respective other connecting line, pressure is provided out of the pressure store or by an output of the blocking device.

6. The device according to claim 5, wherein the control line consists of each branch from the connecting lines and in each branch there are provided the respective check valves for both flow directions, whereby a common discharge line for the blocking device is connected to the check valves with the same flow direction.

7. The device according to claim 6, wherein the pressure store is connected to the common discharge line by another branch.

8. The device according to claim 2, wherein the position of one of the operating pistons having an accumulated drive fluid is changed by the respective adjusting unit.

9. The device according to claim 2, wherein a drive piston of the drive motor, the operating piston of the first adjusting unit and a dosing piston of the conveyor pump of the first adjusting unit are connected with one another through tight couplings between respective piston rods.

10. A process for continuous conveying of flowable materials by at least first and second hydraulic adjusting units into a mixing device, wherein each of the first and second adjusting units comprises a conveyor pump having an operating piston guided in an operating cylinder, and wherein a drive fluid loads the first and second operating pistons, the process comprising the steps of:

driving the first operating piston of the first adjusting unit back and forth by using a drive motor loading the drive fluid;

measuring a stroke of the first operating piston using a first position sensor arranged on the first operating cylinder for obtaining a first measuring signal;

measuring a stroke of the second operating piston using a second position sensor arranged on the second operating cylinder for obtaining a second measuring signal;

sensing a difference between the first and second measuring signals from the two adjusting units for generating an instantaneous actual value;

comparing the instantaneous actual value with an associated desired value to generate an operating signal for the mass flow of the drive fluid;

selecting return points for back and forth movement of the operating pistons; and in response to the operating signal, adjusting the stroke of the first and second operating pistons to the selected return points so that a constant mixture ratio of the flowable materials conveyed by the first and second conveyor pumps is provided.

11. The process according to claim 10, wherein hydraulic connecting lines connect cylinder chambers of the operating cylinders on both sides of the respective operating pistons, the process including the step of:

driving the second operating piston of the second adjusting unit in the same direction as the operating piston of the first adjusting unit using the drive fluid conveyed out of the first operating cylinder under the influence of the drive motor and passing through the connecting lines.

12. The process according to claim 11, wherein the connecting lines are connected with one another through a hydraulic control line which includes a controllable blocking device, the process including the step of:

controlling the blocking device using a proportional governor in response to the operating signal.

* * * * *